March 28, 1967  J. W. TAYLOR  3,311,128
BUTTERFLY VALVE
Filed Feb. 25, 1964  2 Sheets-Sheet 1
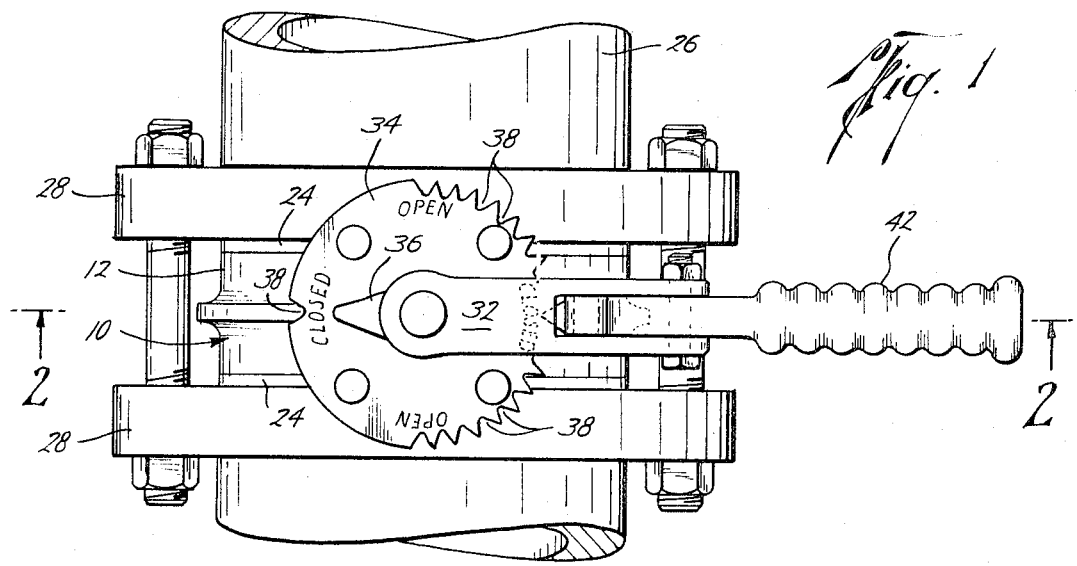
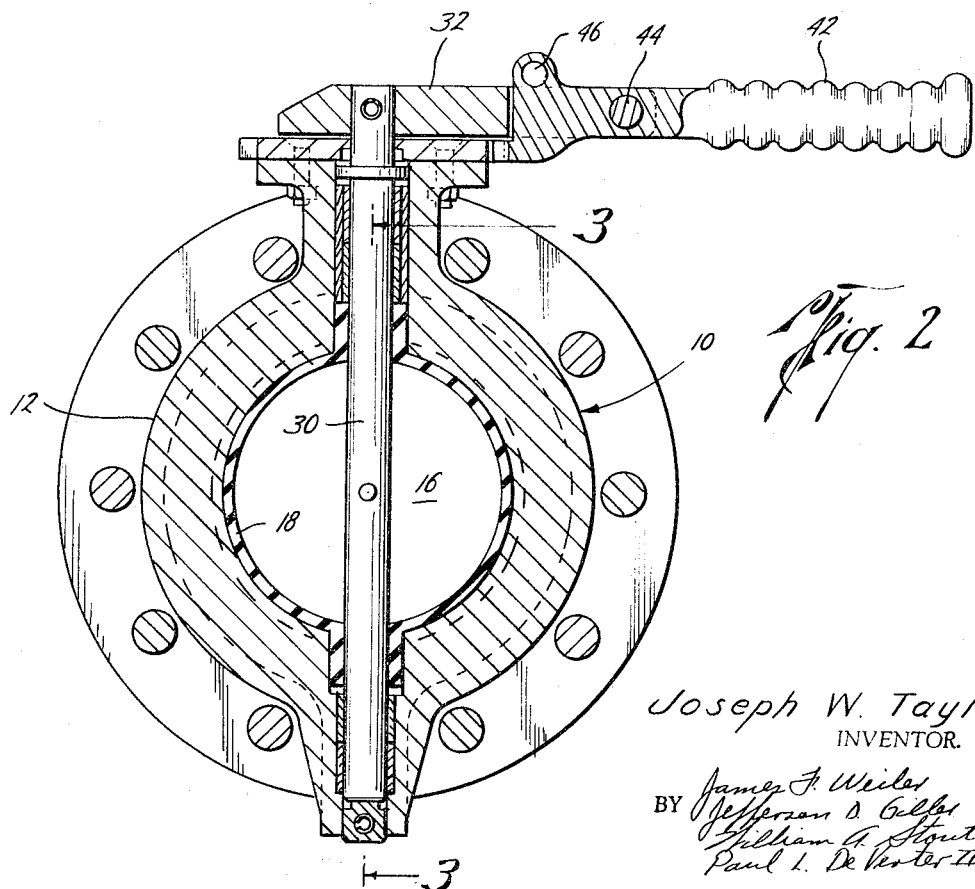
Joseph W. Taylor
INVENTOR.
BY James F. Weiler
Jefferson D. Giller
William A. Stout
Paul L. DeVerter II
ATTORNEYS March 28, 1967
J. W. TAYLOR
3,311,128
BUTTERFLY VALVE
Filed Feb. 25, 1964
2 Sheets-Sheet 2
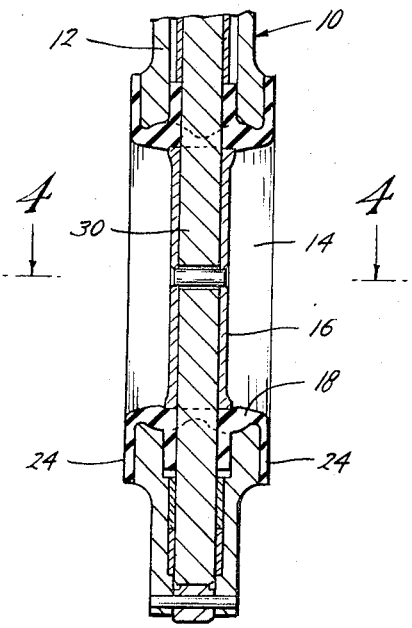
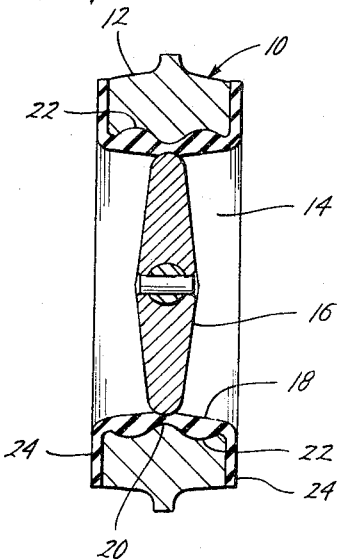
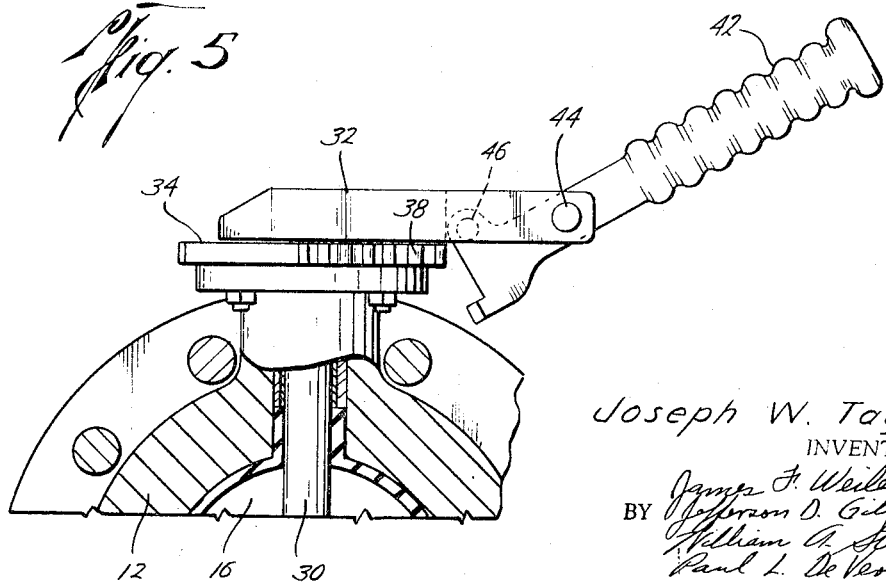
Joseph W. Taylor
INVENTOR.
BY
ATTORNEYS

United States Patent Office 3,311,128
Patented Mar. 28, 1967

1

3,311,128
BUTTERFLY VALVE
Joseph W. Taylor, Houston, Tex., assignor to Daniel
Orifice Fitting Company, Houston, Tex., a corporation
of California
Filed Feb. 25, 1964, Ser. No. 347,240
2 Claims. (Cl. 137—383)

The present invention relates to a butterfly valve for controlling fluid flow including the flow of liquids, gases and flowable solids, and more particularly relates to a butterfly valve wherein the sealing structure acts to increase the sealing force in the valve as the pressure increases.

The present invention is generally directed to a butterfly valve wherein a disc valve member is rotatably positioned in the valve body and is rotated to open, close or throttle the fluid passageway through the valve body.

It is a general object of the present invention to provide a butterfly valve wherein the configuration of the sealing member is such that the sealing member is urged by fluid pressure between the valve member and the valve body to increase the valve sealing force.

A still further object of the present invention is the provision of a butterfly valve having an annular ridge around the inside of the valve body in a transverse plane to the body and wherein the configuration of the sealing member is such that it is forced into the restriction between the ridge and the valve member to increase the sealing force of the valve.

Yet a still further object of the present invention is the provision of a butterfly valve having an annular ridge on the valve body in a transverse plane, said body having a valley adjacent the ridge and an annular seal which is slidably positioned inside of the valve body and over the ridge and valley so as to be forced onto the ridge by the fluid pressure of the valve and into the restriction between the ridge and the valve element to increase the sealing force in the valve.

Yet a further object of the present invention is the provision of a butterfly valve having an annular ridge in the valve body directed inwardly and positioned in a transverse plane to the valve passageway, said valve having an annular valley on each side of the ridge in which an annular sealing member is positioned on the inside of the body to cover the ridge and valley and wherein the seal member is longitudinally slidable in said valve body so that fluid pressures in the valve will cause the sealing member to flow from a valley onto the ridge to increase the sealing force of the valve.

Yet a further object of the present invention is the provision of a butterfly valve having an annular arcuate ridge in said body directed inwardly with an annular valley on each side of the ridge, the ridge having substantially the same radius of curvature as the valve member whereby an annular sealing member covering the inside of and being longitudinally slidable in the body is wedged between the rib and the valve member by the fluid pressure to increase the sealing force of the valve.

A still further object of the present invention is the provision of the butterfly valve having an annular ridge and annular valleys over which a seal member is positioned wherein a lubricant is provided between the seal member and the valve body to provide slidable longitudinal movement of the seal relative to the valve body.

A still further object of the present invention is the provision of a butterfly valve having an annular ridge in said body directed inwardly in a transverse plane with an annular valley on each side of the ridge and wherein

2 an annular longitudinally movable sealing member is provided with supporting flanges at each end of the seal which extend over the ends of the valve body thereby supporting the movable seal and the body and sealing the entire valve body.

A still further object of the present invention is the provision of a butterfly valve having an indication plate which acts in conjunction with the valve handle to indicate the position of the valve and which includes interlocking elements between the indication plate and handle for positively positioning the handle and thus the valve element and includes locking means connected to the handle for locking the valve in a desired position.

Other and further objects, features and advantages will be apparent from the following description of a presently preferred embodiment of the invention, given for the purpose of disclosure, and taken in conjunction with the accompanying drawings, where like character references designate like parts throughout the several views and where, FIGURE 1 is a top elevational view of the valve of the present invention in position in a pipeline, FIGURE 2 is a cross-sectional view taken along the line 2—2 of FIGURE 1, FIGURE 3 is a fragmentary cross-sectional view taken along the line 3—3 of FIGURE 2, FIGURE 4 is a cross-sectional view taken along the line 4—4 of FIGURE 3, and FIGURE 5 is a fragmentary side elevational view illustrating the operation of the valve handle and interlocking indication plate.

Referring now to the drawings, and particularly to FIGURES 1–4, the reference numeral 10 generally designates the valve of the present invention and generally includes a valve body 12 having a passageway 14 therethrough for the flow of fluid, a valve member 16 rotatably supported in the passageway for controlling the flow of fluids therethrough, and an annular sealing member 18 for coacting with the valve member 16 to seal the passageway 14 when the valve member 16 is in its closed position.

The valve member 16 is a conventional disc-shaped butterfly valve member which can be rotatably positioned to open, close, or throttle the flow of fluid through the passageway 14.

Referring now specifically to FIGURE 4, it is noted that the sealing means 18 and the valve member 16 coact to securely seal the passageway 14 when the valve is in the closed position. However, there is a limit as to how far the sealing means 18 may project inwardly from the body 12 towards the valve member 16 to provide a tight seal and yet allow the valve member 18 to be easily rotated. Therefore, an important feature of the present invention is the provision of a sealing structure which will provide a tight engagement of the sealing means 18 against the valve member 16 and yet not interfere with the valve operation and in addition will provide increased sealing force as the pressures in the valve increase. Thus, an annular ridge 20 is provided about the body 12 in a transverse plane to the body and in line with the seating surfaces on the valve member 16. The annular seal 18 is positioned between the ridge 20 and the valve member 16. In addition, the sealing element 18 is not bonded to the ridge 20, but in fact is slidable to some extent thereon in a longitudinal direction. Therefore, as the pressure acts against the seal 18 on the high pressure side, the seal 18 which is elastic to some extent is forced by the pressure into the annulus between the rib 20 and the valve member 16 to increase the sealing force between the seal 18 and the valve member 16 thereby increasing the sealing pressures which the valve 10 can control. The sealing means 18 may be of any conventional and suitable material which is elastic to some extent such as rubber or fluorocarbon. Furthermore, in order to increase the longitudinal movement of the sealing means 18 into the restriction between the rib 20 and the valve member 16 a suitable lubricant may be placed between the body 12 and the sealing means 18 such as, for example only, grease or fluorocarbon powder.

Preferably, the rib 20 is arcuately shaped in cross-section and preferably has approximately the same radius of curvature as the outer edge of the valve member 16.

In addition, in order to provide a structure whereby additional sealing material may be provided for movement into the restriction between the rib 20 and the valve member 16 a valley 22 is provided in the valve body 12 on either side of the rib 20. The outside of the seal 18 will conform to the configuration of the rib 20 and valleys 22. Thus, it is noted that additional sealing material is provided in the valley 22 and because of the wedge-shaped path formed by the surface of the rib 20 and the curved outer edge of the valve member 16 and leading to the annulus between the rib 20 and the valve member 16, the seal 18 will be forced by wedge action thereby increasing the sealing pressure of the valve 10. In addition, the configuration of the ridge and valleys 22 aids in retaining the slidable seal 18 in its proper longitudinal position in the valve passageway 14.

Referring now to FIGURES 3 and 4, it is preferable that the sealing means 18 covers the entire inner surface of the valve body 12 and suitable supporting flanges 24 be provided covering each end of the valve body 12. Thus, the sealing means 18 will cover the entire interior of the valve body 12 exposed to the fluid flow and thus protect the valve body from the flow of corrosive materials. In addition, the flanges 24 will, when the valve 10 is connected in a pipeline 26, as best seen in FIGURE 1, be securely held between the valve body 12 and conventional flanges 28 whereby the longitudinally slidable sealing means 18 will be securely held in place between the flanges 28.

Referring now to FIGURES 1, 2, 3 and 5 the rotatable valve element 16 is supported and rotatably controlled by a conventional shaft 30 journaled in the valve body 12 and which in turn is controlled by a handle 32. However, it is desirable to provide an indicator to indicate the position of the valve. Therefore, an indicator plate 34 is provided with suitable markings which coact with an indicator pointer 36 attached to the handle 32 indicating the position of the valve element 16. In addition, suitable notches 38 are provided around the periphery of the indicator plate 34 which coacts with an engaging tooth 40 so that the handle 32 may be positively interlocked with the indicator plate 34 to place the valve element 16 in the desired open, closed, or intermediate throttling positions. The handle 32 may include a hand gripping element 42 which is secured to the handle by a pivot 44 so that the tooth engaging element 40 may be pivoted out of engagement with the notches 38 and the handle 32 moved to the desired position after which the gripping handle 42 may be pivoted back into place and meshing the engaging tooth 40 onto one of the notches 38 thereby interlocking the handle 32 and valve element 16 securely in place. In addition, a suitable locking hole 46 may be provided in the pivoting handle grip 42 so that a suitable lock may be placed therein to prevent disengagement of the tooth 40 and one of the notches 38 thereby securing the valve element 16 in the desired position and preventing unauthorized operation of the valve.

In operation, the hand grip 42 may be pivoted about its pivot 44 on the handle so as to disengage tooth 40 from an engaging notch 38 (FIGURE 5) and the handle 32 may be rotated to rotate the shaft 30 and the valve member 16 to an open, closed, or any desired intermediate throttling position and the pointer 36 (FIGURE 1) will indicate the position of the valve element 16 inside of the valve 10. The hand grip 42 may then be pivoted to again engage the tooth 40 in the selected notch 38 and a suitable lock may be placed through the hole 46 to lock the valve in its new position.

Referring now to FIGURE 4, it is to be noted that the configuration of the sealing means 18 and of the interior of the body 12 is such that the pressure in the valve 10, when it is in the closed position, forces the sealing means 18 into the restriction between the annular rib 20 and the valve member 16 to increase the sealing pressure of the valve 10. In addition, since the sealing means 18 is not necessarily bonded to, but is preferably slidable on the valve body 12 and is elastic, the seal 18 can longitudinally flow into the restriction and increase the sealing pressure. And if desired, a suitable lubricant such as grease, fluorocarbon powder, or dry film lubricants may be placed between the seal 18 and the valve body 12 to increase the tendency of the seal 18 to move longitudinally. Furthermore, the configuration of the valleys 22 provides a greater volume of sealing material and the configuration of the arcuate rib 20 and curved outer edges of the valve 16 provides a wedge shaped path between the valve member 16 and the valley 22 and rib 20 leading to the restriction at the top of the rib 20. This acts to tend to force a greater volume of material into the smaller area at which the seal is desired.

It is also noted that since a valley 22 is provided on either side of the rib 20, the valve 10 may be used to seal high pressures from either direction in the passageway 14. And while the configuration of the valleys and rib act to support the movable seal 18 in position in the valve body 12, to further assist in holding the movable seal 18 longitudinally in place, the seal 18 may include annular flanges 24 disposed about the ends of the valve body 12. Thus, when the valve 10 is placed into position in a pipeline 26 (FIGURE 1) the connection flanges 28 compress the annular sealing flanges 24 against the valve body and thereby securely hold the slidable seal 18 in position. It is also noted that the annular seal 18 covers the entire interior surface of the valve body 12 and a portion of the shaft 30 and protects them against any corrosive materials flowing therein.

The present invention, therefore, is well suited to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

I claim:

1. In a butterfly valve having a valve body with a passageway therethrough, a disc-shaped valve member rotatably supported in said passageway for opening and closing said passageway upon rotation, the improvement in a sealing structure coacting with the valve member to seal the passage comprising, an annular ridge on said valve body directed inwardly and positioned in a transverse plane to the passageway and directed through the axis of the valve member, said body having an annular valley on each side of the ridge sloping smoothly inwardly to the ridge, an annular sealing member positioned on and covering the inside of the body and being slidable on said ridge and in said valleys for longitudinal movement in the passageway so that the seal is forced by pressure onto said ridge and between said valve member to increase the sealing force in said valve, an annular supporting flange connected to the seal on each end of the valve body for longitudinally supporting the seal and enclosing the inner surfaces of the valve body, and a lubricant between the annular seal and the valleys and ridge.

2. The invention of claim 1 including, an indicating plate connected to the valve body, a handle connected to said valve element for rotatably positioning said valve element, said handle including a hand grip pivotally connected to said handle, a plurality of interlocking elements connecting between said hand grip and said indicating plate for securing and locking said handle relative to the indicating plate in the open, closed, and intermediate positions, and locking means connected to said hand grip for locking said hand grip to the indicating plate thereby securing the valve element in the desired position.

References Cited by the Examiner

UNITED STATES PATENTS

| 1,490,039 | 4/1924 | Spencer | 251—99 |
| 2,856,952 | 10/1958 | Stillwagon | 251—306 X |
| 2,923,524 | 2/1960 | Fawkes | 251—306 |
| 2,979,076 | 4/1961 | Kish | 137—385 X |
| 2,994,571 | 8/1961 | Peras | 277—188 X |
| 3,072,139 | 1/1963 | Mosites | 137—375 |
| 3,200,836 | 8/1965 | Trefil et al. | 137—385 |

FOREIGN PATENTS 1,181,609  12/1959  France.

M. CARY NELSON, *Primary Examiner.*

HENRY T. KLINKSIEK, *Examiner.*